US006988038B2

(12) United States Patent
Trappe et al.

(10) Patent No.: US 6,988,038 B2
(45) Date of Patent: Jan. 17, 2006

(54) METHOD FOR THE DETERMINATION OF LOCAL SIMILITUDE FROM SEISMIC 3D MEASURED DATA

(75) Inventors: Henning Trappe, Burgwedeler Strasse 89, 30916 Isernhagen (DE); Juergen Pruessmann, Burgwedel (DE)

(73) Assignee: Henning Trappe, (DE)

( * ) Notice: Subject to any disclaimer, the term of this patent is extended or adjusted under 35 U.S.C. 154(b) by 0 days.

(21) Appl. No.: 10/488,155

(22) PCT Filed: Jul. 31, 2002

(86) PCT No.: PCT/DE02/02795

§ 371 (c)(1),
(2), (4) Date: Feb. 27, 2004

(87) PCT Pub. No.: WO03/027710

PCT Pub. Date: Apr. 3, 2003

(65) Prior Publication Data

US 2004/0210394 A1    Oct. 21, 2004

(30) Foreign Application Priority Data

Aug. 31, 2001  (DE) ............................... 101 42 785

(51) Int. Cl.
*G01V 1/28* (2006.01)
(52) U.S. Cl. ...................................................... 702/17
(58) Field of Classification Search ................ 702/17, 702/14, 18; 367/73
See application file for complete search history.

(56) References Cited

U.S. PATENT DOCUMENTS

| 4,570,246 | A | * | 2/1986 | Herkenhoff et al. | .......... 367/68 |
| 4,866,659 | A |   | 9/1989 | Lin et al. | |
| 5,563,949 | A |   | 10/1996 | Bahorich et al. | |
| 5,986,974 | A |   | 11/1999 | Luo et al. | |
| 6,141,622 | A |   | 10/2000 | Keller et al. | |
| 6,151,555 | A | * | 11/2000 | Van Bemmel et al. | ......... 702/14 |
| 6,651,006 | B1 | * | 11/2003 | Trappe et al. | ................. 702/14 |

FOREIGN PATENT DOCUMENTS

| WO | WO 97 13166 A |   | 4/1997 |
| WO | WO 00/46615 | * | 8/2000 |
| WO | WO 00 54207 A |   | 9/2000 |

OTHER PUBLICATIONS

Kurt J. Marfurt et al., "3-D Seismic Attributes Using a Semblance-Based Coherency Algorithm".

* cited by examiner

*Primary Examiner*—Donald E. McElheny, Jr.
(74) *Attorney, Agent, or Firm*—Pendorf & Cutliff

(57) ABSTRACT

The invention concerns a method for the determination of local similarity values for geological units in the subsurface from a seismic 3-D dataset, which consists of a multitude of traces, each of which being formed by a sequence of data points that carry amplitude values, and especially a method for the determination of local dip-dependent similarity values, in each weighted environment of an analysis point, determining the maximum similarity value, which is assigned, together with the corresponding dip angle and dip azimuth, to the respective analysis point.

20 Claims, 6 Drawing Sheets

METHOD FOR THE DETERMINATION OF LOCAL SIMILITUDE FROM SEISMIC 3D MEASURED DATA

CROSS REFERENCE TO RELATED APPLICATION

This application is a national stage of PCT/DE02/02795 filed Jul. 31, 2002 and based upon DE 101 42 785.9 filed Aug. 31, 2001 under the International Convention.

BACKGROUND OF THE INVENTION

1. Field of Invention

The invention concerns a method for the determination of local similarity of geological units in the subsurface from a seismic 3-D dataset, which consists of a multitude of traces, each of which being formed by a sequence of data points that carry amplitude values, or seismic attributes derived therefrom.

2. Related Art of the Invention

Seismic reconnaissance methods are used worldwide in order to obtain additional knowledge on the distribution of geological structures in the subsurface, in addition to the information from drilled wells. The information from seismic data often allows to renounce on further reconnaissance wells, or to reduce their number to a minimum.

For the seismic reconnaissance of the subsurface, sensors (geophones/hydrophones) are used. Being aligned in a line (2-D seismics), they receive sound waves. These waves are emitted by a seismic source, e.g. by an explosive charge, vibrators, or airguns, and they are partially reflected back to the surface by subsurface layers. There they are registered, and recorded in form of a time series. This time series represents the arriving seismic energy in form of amplitude fluctuations. It is stored digitally, and consists of regularly spaced data samples, which are characterized by the respective time and by the corresponding amplitude value. Such a time series is called a seismic trace. The recording line moves across the area to be examined, and thus this a 2D seismic profile is recorded with this geometry.

The subsequent processing aims at a noise suppression, e.g. by stacking, or by dedicated application of filters. After stacking, which sums up those reflection amplitudes that are assigned to the same subsurface points, the term 'poststack data' is used. The results are vertical profiles, with a time or depth dependent representation of amplitudes and traveltimes, as well as attributes derived from the amplitudes, which serve as a basis for further geologic evaluation. The geologic layers can be followed on a profile by the lateral alignment of amplitudes.

If data are not recorded along a line but in an areal grid, a three-dimensional data volume results. In the case of a 3-D volume, an amplitude values is assigned to an arbitrary point in the subsurface, which may for example be described by Cartesian coordinates. The vertical direction is measured in time (traveltime of sound).

In this case, a large amount of data is produced (several Gigabytes), which are stored and subjected to the processing, before the actual interpretation e.g. for the further reconnaissance of the subsurface is possible. These processes require large computer resources and software, in order to process and correct the recorded signal. The result is given by poststack data, that represent a seismic volume in form of a 3-D dataset. The 3-D dataset represents physical and structural characteristics of the subsurface in a seismic image.

From this dataset, arbitrary cuts may be extracted, e.g. vertical profiles, and horizontal maps from different depths, which are interpreted in the following by geophysicists and geologists. Since this interpretation of the achieved seismic images mainly comprises an optic correlation, attempts have been performed to automatize this subjective evaluation that depends on one, or more interpreters.

Accordingly, the U.S. Pat. Nos. 5,563,949 and 6,092,026 describe a method, which highlights faults and zone of low coherency in a three-dimensional volume of stacked seismic data. This data volume is subdivided into a number of horizontal slices, and these slices are again subdivided into a number of cells. The cells contain portions of at least three seismic trace each, in a horizontal configuration that allows a comparison in two pre-defined vertical planes, e.g. along the inline and crossline directions. As mathematical methods for determining the similarity, or coherency of the traces in these planes, the cross-correlation and the covariance are explicitly mentioned. The maxima of the cross-correlations allow an estimation of the partial dip in the respective planes. These maxima can be determined for both correlation planes, and be combined into a single coherency value by a mathematical Operation. To each processed cell, the corresponding coherency value is assigned, and a new seismic volume of the coherency derived in this way, is thus created.

The calculation of trace similarity and dip by comparison of two traces in inline direction, and in crossline direction, respectively, is very sensitive to noise. Large time windows have to be chosen in order to obtain stable results, thus reducing the resolution. The method measures the local similarity/dissimilarity in cells, that possess a fixed form and orientation with respect to the coordinates of the seismic data volume. A continuous, distance dependent correlation, and possibly as well direction dependent correlation of the data can not be considered. The seismic data contained in the cell is entered into the measurement of local similarity/dissimilarity with a constant weight.

A further method is known from the U.S. Pat. No. 6,141,622, which measures the local similarity, or dissimilarity, respectively, of the seismic data in a three-dimensional seismic data volume. The measurement is carried out in a cell with vertical extension in time, and horizontal extension in the inline-crossline plane.

The traces used for the measurement are located either on one line, i.e., on an inline or crossline, or they are located on two lines, i.e., on an inline and on a crossline, symmetrically to the intersection of both lines. On these lines, 3, 5, or 7 neighboring traces are selected. The semblance, or the inverted semblance is measured in the cells. The measurement is performed exclusively along the inline, or crossline included. For the two directions contained the x-shaped cell, two measurements are obtained, that are then summed together.

The method measures the local similarity/dissimilarity in cells, that possess a fixed form and orientation with respect to the coordinates of the seismic data volume. A continuous, distance dependent correlation, and possibly as well direction dependent correlation of the data can not be considered. The seismic data contained in the cell is entered into the measurement of local similarity/dissimilarity with a constant weight. Dip is not considered.

The U.S. Pat. No. 6,138,075 describes a method that measures the local similarity, or dissimilarity of seismic traces in a three-dimensional seismic data volume. For the measurement, a cell is defined in the vertical direction along the traces, and in the horizontal plane. The cell contains a reference trace, and at least two neighbor traces. For each neighbor trace, an individual value of the similarity to the reference trace is determined by applying mathematical measures like semblance, or cross-correlation. The local dips of the data volume are taken into account by vertically shifting the neighbor traces in a pre-defined range, and selecting the maximum similarity value. The neighbor trace with the largest similarity value is declared the target trace. Then all similarity values that have been derived up to this stage, are regarded as preliminary, and are deleted. The final similarity measurement takes place exclusively between The reference trace and the target trace, and it may well use a different similarity measure, e.g. the 'Manhattan distance'.

The determination of similarity values by comparison of two traces, respectively, is very sensitive to noise. The limitation of the comparison to neighbor traces is not suited to detect gradual changes of the seismic behavior, which extend over distances of the order of many trace intervals, and where the change in the range of one trace interval is below the noise level of the data.

Another method is known from the U.S. Pat. No. 6,151, 555, or WO 00/54207, respectively, which measures the local dissimilarity of seismic traces in a three-dimensional data volume. Tow alternative measures of the dissimilarity are given, following the concept of the statistical variance. For the measurement, a cell is defined in the vertical direction along the traces, and in the horizontal plane. For the horizontal plane. quadratic cells with 3×3 or 5×5 traces, as well as an x-shaped cell with 5+5 traces in both orthogonal directions, are offered for selection. The vertical extension of the cell is described by the number of contained samples along each single trace; this simultaneously represents the number of horizontal data slices. A triangular weight function assigns a weight to each horizontal data slice. Within the horizontal plane, however, no weighting takes place. Hence, each horizontal position contributes in the same way to the measure of dissimilarity. In each horizontal data slice, the mean, the sum of the squared deviations from the mean, and the sum of the squares is derived from data values contained in the slice. Two measures of dissimilarity can be calculated from these quantities as follows:

1. The sums of the squared deviations are multiplied with the vertical weight function, and summed for all horizontal data slices; the sums of the squares are treated equivalently, and finally the former are divided by the latter.
2. Alternatively, an individual quotient is calculated for each horizontal data slice, by dividing the sum of the squared deviations by the sum of the squares; these quotients are multiplied with the vertical weight function, and finally summed for all horizontal data slices.

The method measures the local dissimilarity in cells, which possess a fixed form and orientation with respect to the coordinates of the seismic data volume. A continuous, distance dependent correlation, and possibly as well direction dependent correlation of the data can not be considered. The seismic data contained in the cell is entered into the measurement of local similarity/dissimilarity with a constant weight. A consideration of dip does not take place.

Furthermore, a method is known from the DE 199 33 717 C1 which relates to the similarity analysis of data points belonging to a pre-defined three-dimensional environment of the analysis point just considered in a three-dimensional seismic dataset. The three-dimensional seismic dataset consists of a multitude of traces, each of which is composed as a sequence of data points to which amplitude values are assigned, or seismic attributes derived from amplitude values. This method, however, calculates the similarity of local sections of seismic data from the measurement dataset to a reference section corresponding to a pre-defined location and depth, and assigns this similarity value as an attribute to the central value of the corresponding local section.

A method is known from the WO 97/13166, which measure the local dissimilarity of seismic traces in a three-dimensional seismic data volume with a semblance method. For the measurement, a cell is defined in the vertical direction along the traces, and in the horizontal plane. In the horizontal plane, the cell has an elliptical, or rectangular shape, and it is centered at the analysis point. The main axis of the cell may exhibit an arbitrary angle to the horizontal co-ordinate axis of the seismic data. However, its orientation with respect to the data grid is then rigidly fixed by this angle. The measurement of the similarity may thus include one direction of preference at most, which is defined by the direction of the main axis. The vertical extension of the cell is described by the number of contained samples along each single trace; this simultaneously represents the number of horizontal data slices.

The semblance is calculated with in the cell for complex traces, i.e., for each real trace, a Hilbert transformed imaginary trace has to be derived. An estimation of the coherency follows from the averaging of the semblance over the vertical extension of the cell. In each horizontal data slice, the sum of the real values, and the sum of the Hilbert transformed values are calculated. Each of these sums is subsequently squared. These squared amplitude sums of all horizontal data slices are summed in order to form the numerator of the semblance. The denominator contains the sum of the squares of all real, and Hilbert transformed single values that are contained in the cell. The semblance in calculated as a dip dependent quantity, with dip being described by two parameters. These parameters are the apparent dips in the directions of the orthogonal horizontal data axes. They can be transformed into the parameter pair of dip and azimuth angles. For the dip dependent semblance calculation, the vertical position of the cell in the three-dimensional data volume is changed, whereas its horizontal shape and centering at the analysis point is preserved. The cell is sheared according to the apparent dips, i.e., the partial sums for the semblance calculation are derived in correspondingly dipping data slices. The dips to be considered are limited by a maximum dip angle. Three alternative schemes for the discretization of the solid angle are given in a polar representation of the dip and azimuth angle. The discretization may be performed with a quadratic, a triangular, or a radial grid. The radial grid is hereof regarded as disadvantageous.

Contrasting to the other schemes, it involves a highly non-uniform discretization of the solid angle.

The presented method does not use weighting in the horizontal plane, which could take into account a decrease of the lithologic and structural correlation of geologic bodies with distance. A temporal weighting is not applied either. The horizontal cell may possess a direction of preference, the orientation of which remains unchanged during the whole process of the similarity or coherency determination in the three-dimensional data volume. Hence, during the dip measurement, this rigidly oriented cell is not oriented according to the dip azimuth, i.e. to the direction of structural strike that varies more or less in the considered volume. If the directions of geologic strike, which are assumed during the dip dependent similarity measurements, vary with respect to the direction of preference of the cell, this may be disadvantageous, since the direction of largest continuity in geological bodies often has a relation to the direction of geological strike. Consequently, a possibly existing direction of preference of the cell may be oriented partly in parallel, partly perpendicular, and frequently with other angles to the directions of geologic strike of the considered dips. However, here it is possible that the measured similarity values render a distorted view of the exising dip dependence in the data, since the measurement renders systematically increased, or decreased similarity for some azimuth ranges due to the orientation of the analysis cell.

Moreover it is disadvantageous, that the Hilbert transformed imaginary trace must be calculated for each real trace within the calculation of similarity with consideration of dip and dip azimuth. This additionally requires significant calculation capacities. This method known from the WO 97/13166 is also revealed with supplementary examples in the publication by Marfurt, K. J., et al.: 3-D seismic attributes using a semblance-based coherency algorithm.— In: Geophysics, 1998, volume 63, page 1150–1165.

All previously mentioned, known methods perform the measurement of a similarity value in cells within a three-dimensional volume of seismic poststack data. The cells possess a fixed form and size in the spatial horizontal plane. The partial sequences of seismic traces that are contained in a cell, contribute with a horizontally constant weight to the derivation of individual similarity values for single pairs of traces, or of a general similarity value for the whole cell. Hence, the trace weighting jumps from a constant positive level inside the cell to the value zero outside the cell. This means, that all methods cannot the take into account the degree of spatial continuity of geological bodies, as it is derived e.g. by variographic analysis, since neighborhood relations are not weighted. Variography calculation and modeling is a prerequisite of geostatistics. It is used to describe quantitatively the distance dependent, and, if appropriate as well direction dependent spatial relations of neighboring points.

SUMMARY OF THE INVENTION

The purpose of the invention is to provide a processing method for seismic 3-D data for the determination of the local similarity of geological units in the subsurface, where in this method the spatial continuity is considered with a distance dependence, and, if appropriate, as well with a direction dependence.

This task is solved by a method for the determination of local similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:

assigning an environment that is weighted at least horizontally, to a respective analysis point, wherein weight factors according to a weight function are assigned to the data points in the environment of the analysis point;

calculating similarity values in each weighted environment, whereby the weight function is included in the similarity measure, and wherein the interval between neighboring analysis points in the 3-D dataset is selected as multiples, and especially as integer multiples of the data point intervals, preferably between one and several tens, especially preferred between three and ten data point intervals.

Hence, the invention comprises a method for the automatic detection and evaluation of structural, facial and lithologic units with discontinuities and transitions of different spatial magnitudes in seismic data. It is designed for the processing of a multitude of seismic traces from a three-dimensional data volume. The three-dimensional data volume can be arranged in a way, that the location of a single trace is characterized by two coordinates (x,y) in a horizontal plane, whereas the third, vertical coordinate axis is directed along the vertically arranged seismic traces. The third coordinate (z) can describe a time or depth on a seismic trace. For discrete coordinate values $(x_i, y_j, z_k)$, the three-dimensional volume contains single data values, i.e., samples $s(x_i,y_j,z_k)$ of the seismic amplitude, or of a seismic attribute derived thereof.

By the weighted environment of each analysis point, a spatially weighted determination of the neighborhood relation is provided for the detection of facial, lithologic and structural units, and their transitions, respectively. The dimension and weighting of the environment that is used for the determination of the neighborhood relation can be selected in analogy to the spatial relations determined by variographic analysis. Alternatively, a weight function can be extracted from the scientific literature with dedication to certain geologic problems. Weighted environments of any form and size can be used for similarity measurements, since the weight function is usually defined on the whole data volume. For the similarity evaluation, the weighted environment can be combined with an arbitrary similarity measure, by incorporating the weight function into the selected similarity measure. Common similarity measures for seismic data are e.g. the semblance, the correlation, or the variance.

This similarity analysis is preferably carried out with consideration of the local dips, by calculating dip dependent similarity measures according to claim 2.

The reflections of a three-dimensional seismic data volume represent the layer planes, and tectonic boundary planes of the subsurface, which often do not extend horizontally, but with dips of varying strengths and directions.

Correspondingly, dipping reflections occur in the seismic data volume as well.

For such reflections with varying dips, comparable similarity values must be determined. For this purpose, the similarity measurement is carried out along the local dip of the seismic data. For this dip dependent similarity measurement, the weighted environment is sheared vertically, such that the previously horizontal planes of this environment are inclined according to the local dip.

However, the local dip of the seismic data at an analysis point is unknown at the beginning of the similarity measurements, and must be estimated. Here it is assumed that the similarity measurements at different dips render a maximum similarity value in that case, where the dip of the measurement, and the local dip in the data volume coincide.

In order to find this dip-dependent maximum with sufficient accuracy, the range of possible dips is subdivided according to a preferably uniform discretization of the solid angle.

After the detection of the dip dependent coherency maximum, this coherency maximum and the corresponding dip and azimuth angles are stored as the results of the similarity measurements, and assigned to the respective analysis point. They are then available for further digital evaluation, e.g. by pattern recognition. Furthermore, they are graphically displayed to the interpreter on the monitor screen, along cuts through the three-dimensional volume, or along the evaluated time slices, or horizons, respectively. Clearly, these displays can be printed as well.

If the weight function is centered at the analysis point, and exhibits decreasing values away from the analysis point, then the influence of a data value on the similarity measure will decrease with increasing distance from the analysis point, as has to be commonly assumed.

If the weighting is embodied by window functions, especially by triangular, Hamming, Hanning or Daniell functions, then an environment that is limited by the window function is chosen for the similarity evaluation.

By using a weight function that decays with distance (d) from the analysis point up to infinity, especially by using $d^{-c}$, $e^{-cd}$, $e^{-cdd}$ with c=arbitrary constant, and by setting the weight to zero beyond a maximum distance ($d_{max}$) from the analysis point, the calculation effort for functions that decay for an infinite distance range, is limited as well. At the maximum distance from the analysis point, the transition to the weight factor zero can be smoothed, e.g. by an additional linear transition function, in order to reduce edge effects in the calculation of similarity values.

A finite environment for the similarity evaluation is also provided by an arbitrary positive weighting, where a window function causes a tapering to the value zero in an edge area. Here the weighting is formed as the product of two functions, where one of the functions does not decay, or does not fully decay with distance from the analysis point, and the other function represents a window function, which possesses the value 1 in the central area of the environment, decreases from 1 to 0 in an edge area of the environment, and exhibits the value 0 outside the environment.

By forming a weighted environment with a rotational symmetry around the analysis point at least in the horizontal plane, a directionally neutral environment is defined, which does not exhibit a direction of preference in the similarity calculations.

A distance dependent weighting can be equipped with a direction of preference by a direction dependent scaling of the distance measure, preferably by an elliptical scaling. By rotating a weighted environment that does not exhibit a rotational symmetry around the analysis point, according to the respective dip azimuth for the determination of similarity values, and especially by orienting an existing direction of preference that is due to the non-symmetry, in a fixed geometrical relation with respect to the dip azimuth, it can be taken into account that in geological bodies the direction of largest continuity is often related to the direction of geological strike, or to the dip azimuth, respectively. By rotating the environment that does not exhibit a rotational symmetry, together with the respective discrete dip azimuths that are considered in the measurement of similarity, a distortion of the similarity values can just be avoided for typical geological structures.

If the analysis interval between neighboring analysis points in the 3-D dataset is selected as a multiple, and especially as an integer multiple of the data point interval, preferably between one and several tens, especially preferred between three and ten such data point intervals, the computation time can be significantly reduced, since a similarity measurement must not be performed for every sample position. The selection of the analysis points is defined by lateral and vertical analysis intervals. These analysis intervals are preferably integer multiples of the data point intervals, i.e., the sample intervals. However, rational multiples are as well possible, requiring an assignment of interpolated data values to positions that are defined between the measured data points. After calculating a similarity value and a dip with corresponding azimuth at an analysis point, the used weighted environment is centered at the analysis point that is next according to the pre-defined analysis interval. For environments with a large spatial extension, large analysis intervals between neighboring analysis points can generally be used in order to reduce the computation effort, without deteriorating the resolution.

If the dip and azimuth angles are discretized at constant radial and angle intervals in a radial grid, the solid angle can be classified with advantageous simplicity in the statistical evaluation, and in color displays of strike directions. However, it is disadvantageous that the constant angle intervals imply a very non-uniform discretization of the solid angle. Near the grid origin (horizontal layering), the analysis points are narrowly spaced, which means an unnecessary load on the computing capacity.

Hence, it is proposed as a further development, that, for the calculation of similarity values at discrete spatial orientations, the discrete dip angle ($\theta_i$) is calculated as follows, starting from a pre-defined maximum dip angle ($\theta_{max}$): at dip angles $\theta_i$ with $\theta_{max}/2<\theta_i\leq\theta_{max}$, a similarity value is calculated for every discretized azimuth, at dip angles $\theta_i$ with $\theta_{max}/4<\theta_i\leq\theta_{max}/2$, the calculation is performed for every second azimuth, at dip angles $\theta_i$ with $\theta_{max}/8<\theta_i\leq\theta_{max}/4$ for every forth azimuth, at dip angles $\theta_i$ with $\theta_{max}/16<\theta_i\leq\theta max/8$ for every eighth azimuth, etc., with a preferred termination at the fourth subdivision. Thus, the disadvantage of the non-uniform discretization of the solid angle in the radial grid, and of the corresponding computation effort for many similarity determinations near the grid origin, is compensated for. However, the discretization of the dip and azimuth angles in constant steps, which is advantageous for further evaluations, is retained. In the dip estimation as described before, the accuracy of the determination of the azimuth angle can be refined during an optional further stage, if for a dip estimate in a coarsened azimuth interval, similarity values are calculated at the original angle steps on both sides of the first estimate, as long as an increase of the similarity values is observed. The first dip estimate is replaced by the dip and azimuth angles of the general maximum, if the maximum of the similarity values from this second stage exceeds the maximum from the first stage.

When computing the similarity along arbitrarily oriented planes as the square of the representative attribute (amplitude), divided by the average of the squared attribute (amplitude), the representative amplitude replaces the mean amplitude of the semblance measure which is common in seismics. The representative amplitude is computed, e.g. by a neuronal network.

Preferably, the representative attribute is the weighted median of the attributes to be analyzed. The application of the weighted median of the amplitude (the attribute) implies a sorting out of single strong spikes and noise amplitude, which in case of the semblance can have a strong influence on the result. This sorting-out improves the analysis result.

According to claim 14, the weighted median coherency is modified for the application with weighted environments.

The weighted coherency on the basis of the weighted semblance, as given in claim 15, does as well take into account the weight factors of the similarity determination. In the following, an example of an embodiment is described in details, with reference to the enclosed drawings.

DETAILED DESCRIPTION OF THE INVENTION

Figure 1:
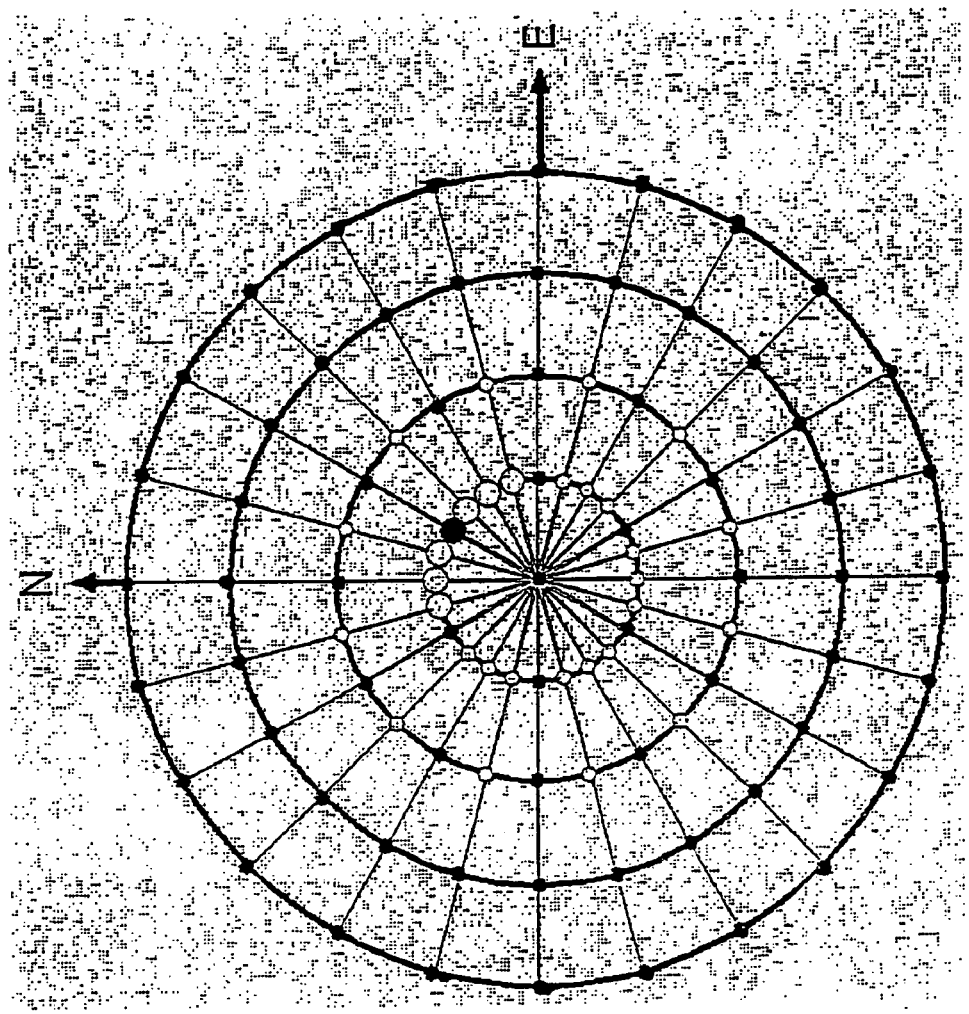
FIG. 1 a discretization of the solid angle by a modified radial grid.

First, the basis for calculation and data evaluation according to the invention is described in the following.

Weight Function

Around each analysis position $(x_I, y_J, z_K)$ that is selected for the calculation of a similarity value, a three-dimensional environment is defined by a weight function $$g_{IJK}(x_i, y_j, z_k) = g(x_i - x_I, y_j - y_J, z_k - z_K). \quad (1)$$

This weight function contains arbitrary values $g(x,y,z) > 0$ in a three-dimensional environment of arbitrary shape and arbitrary extent, around the co-ordinate origin $(x,y,z) = (0,0,0)$, and it contains values $g(x,y,z) = 0$ outside this environment. It contains the weights, which are imposed on the seismic data values located in the environment, when they are entered into the calculation of a similarity value at the selected analysis location $(x_I, y_J, z_K)$.

This function can e.g. exhibit decaying weights at the edge of the environment, and thus reduce edge effects in the calculation of similarity values. Just as well, a stronger weighting of the values located closer to the origin, can improve the result, since this favors the direct neighbor values in the calculation of the similarity value. Generally, this weighting can also be derived from variograms, which describe the distance dependent correlation of parameters in the investigation area.

Special weight functions can be composed from independent partial function for single co-ordinates, e.g. in the form $$g(x,y,z) = p(x,y)f(z), \quad (2a)$$

or $$g(x,y,z) = l(x)h(y)f(z), \quad (2b)$$

where $f(z)$ describes an arbitrary function for the extraction of time or depth windows from seismic traces. Here, for example, a triangular temporal weighting can be used in combination with a horizontal weighting $p(x,y)$, or $l(x)h(y)$, according to the equations (2a) and (2b).

The horizontal weight function $p(x,y)$ in equation (2a) can be selected e.g. in analogy to the spatial relation derived by variographic analysis. From distance dependent, and, if appropriate, direction dependent values of the spatial correlation, value tables can be derived, which are subsequently interpolated, or approximated by analytical functions. Spatial directions of preference can be emphasized, or reduced along the horizontal coordinate axes by scaling factors $a,b > 0$ according to $$g(x,y,z) = p_{a,b}(x,y)f(z) = p(ax,by)f(z), \quad (3a)$$

and be rotated in the horizontal plane by an angle $\alpha$ according to $$g(x,y,z) = p_{a,b,\alpha}(x,y)f(z) = p(a[x \cos \alpha - y \sin \alpha], \\ b[x \sin \alpha + y \cos \alpha])f(z) \quad (3b)$$

From this, special weightings with elliptical and circular geometry follow with the elliptic equation $$r_{a,b,\alpha}(x,y) = (a^2[x \cos \alpha - y \sin \alpha]^2, b^2[x \sin \alpha + y \cos \alpha]^2)^{0.5} = \text{const} \quad (4a)$$

as $$g(x,y,z) = q(r_{a,b,\alpha}(x,y))f(z). \quad (4b)$$

The circular geometry follows with $a = b$.

The function $q(d)$ in equation (4b) describes a distance dependent weighting. Here, weightings are preferred which decay with distance. Every window function that is common in seismic data processing may be used, e.g. the triangular, Hamming-, Hanning-, Daniell functions, or other weight functions. Beyond a maximum distance $(d > d_{max})$, the window functions usually adopt the value zero.

In case functions that decay for values up to infinity, the computation effort can be limited as well by using these functions only up to a maximum distance $d_{max}$, and setting the function value to zero at larger distances $(d > d_{max})$. At $d_{max}$, a jump of the weight function $q(d)$ is thus created, which can be compensated for by local smoothing. Suitable functions that decay with distance $d$ up to infinity are $d^{-c}$, $e^{-cd}$, $e^{-cdd}$, and other functions.

The functions $q(d)$ listed here, can also be used for a weighting according to equation (2b) with $l(x) = q(|x|)$ or $h(y) = q(|y|)$.

As long as no other information favors the selection of a special weight function, the common practice has shown that the similarity calculation with the Gaussian bell shaped exponential curve as a horizontal weight function renders good results. The environment of an analysis location in equation (1) is defined by a special weight function according to equation (4a,b). In this way, the distance dependent weighting has the form $$q(d) = \begin{cases} e^{-d^2} & \text{for} \quad 0 \le d \le 1.5 \\ 0.5797 - 0.3162d & \text{for} \quad 1.5 < d \le 1.8333 \\ 0 & \text{for} \quad 1.8333 < d \end{cases} \quad (5a)$$

with the scaled distance $$d = r_{a,a,0}(x,y) = a(x^2 + y^2)^{0.5}. \quad (5b)$$

For a similarity determination with high resolution, a distance scaling according to $a^{-1} = 2\Delta u$ has proved to be efficient, with $\Delta u$ being the average interval of the horizontal discretization in the seismic volume. For the resolution of facies changes, the reciprocal scaling factor $a^{-1}$ should be chosen in the order of characteristic lengths of the geologic bodies.

Similarity Measure

In connection with a weighted environment, most of the common similarity measures have to be modified. With help of such modifications, however, all known similarity measures can be applied as well in horizontally and vertically weighted environments. A significant modification is the following, that each summed value is weighted in the sums over amplitudes, squared amplitudes, or other functions of the amplitude, and that the normalization of such sums does not incorporate the number of summed values, but the sum of the corresponding weight factors.

For two special similarity measures, this modification is described in the following:

The weighted environment $g_{IJK}(x_i, y_j, z_k)$ of an analysis location $(x_I, y_J, z_K)$ is defined in equation (1). A similarity measurement is performed within this environment along a horizontal data slice at an arbitrary time or depth $z_k$. In analogy to the semblance that is common in similarity measurements, the following weighted semblance can be used:

$$S_{\bar{k}}(x_I, y_J, z_K) = \frac{\left\{\sum_{i,j} g_{IJK}(x_i, y_j, z_{\bar{k}})\right\}^{-1}\left\{\sum_{i,j} g_{IJK}(x_i, y_j, z_{\bar{k}})s(x_i, y_j, z_{\bar{k}})\right\}^2}{\sum_{i,j} g_{IJK}(x_i, y_j, z_{\bar{k}})\{s(x_i, y_j z_{\bar{k}})\}^2} \quad (6a)$$

By summation over the entire time or depth range of the weighted environment, the similarity measure of the weighted coherency results:

$$S(x_I, y_J, z_K) = \frac{\sum_k\left[\left\{\sum_{i,j} g_{IJK}(x_i, y_j, z_k)\right\}^{-1}\left\{\sum_{i,j} g_{IJK}(x_i, y_j, z_k)s(x_i, y_j, z_k)\right\}^2\right]}{\sum_k\left[\sum_{i,j} g_{IJK}(x_i, y_j, z_k)\{s(x_i, y_j z_k)\}^2\right]} \quad (6b)$$

With the normalization in the nominator as in equation (6b), using the sum of the weights, the similarity measure is in many cases more uniformly influenced by the amplitude distribution of the whole environment, than with the normalization in the denominator as described in the following:

$$\bar{S}(x_I, y_J, z_K) = \frac{\sum_k\left\{\sum_{i,j} g_{IJK}(x_i, y_j, z_k)s(x_i, y_j, z_k)\right\}^2}{\sum_k\left[\left\{\sum_{i,j} g_{IJK}(x_i, y_j, z_k)\right\}\sum_{i,j} g_{IJK}(x_i, y_j, z_k)\{s(x_i, y_j, z_k)\}^2\right]} \quad (6c)$$

The weighted coherency in the formulation (6b), or in the modification (6c), contains two-step summations: The inner summations concern the positions in a horizontal plane, the outer summations, on the contrary, concern the horizontal planes that are present in the weighted environment. This is an orientation sensitive measurement of similarity, which measures similarity in the horizontal direction. An orientation insensitive similarity measurement generally comprises only one-step summations over all data points that are contained in the weighted environment. In this way, the weighted coherency is obtained as an orientation insensitive similarity if in equation (6a), each of the summations over the horizontal indices i,j is extended by the summation over the vertical index $\bar{k}$.

The seismic amplitude values in an environment do on one hand reflect the geology of the subsurface, but on the other hand they are partly as well the result of a disadvantageous signal-to-noise ratio. Hence, this invention prefers a similarity measurement, which improves the signal-to-noise ratio in the similarity determination.

This concept is based on a generalization of the semblance, and comprises the weighted median similarity, and the median coherency, as described in the following. The application of these similarity measures is performed in analogy to the similarity measures previously described.

Again, a horizontal data slice at an arbitrary time or depth $z_{\bar{k}}$ with a total of N amplitude values $s(x_i, y_j, z_{\bar{k}})$, and with N corresponding weight factors $g_{IJK}(x_i, y_j, z_{\bar{k}})$ is considered. The amplitude values are sorted in increasing order, and newly indexed:

$$s_1 \leq s_2 \leq s_3 \leq \ldots \leq s_{N-1} \leq s_N.$$

This sorting and indexing are as well transferred to the values of the weight function $g_{IJK}$, that belong to the seismic amplitudes:

$$g_1, g_2, g_3, \ldots g_{N-1}, g_N$$

From this, partial sums of the weight factors are derived:

$G_1 \leq G_2 \leq G_3 \leq \ldots \leq G_{N-1} \leq G_N$, where $G_n = \Sigma g_i$ ($i=1$ to $n$).

Now the weighted median can be derived as $$m_{IJK}(z_{\bar{k}}) = \begin{cases} s_n, & \text{if } G_{n-1} < \frac{G_N}{2}, G_n > \frac{G_N}{2} \\ \frac{s_n + s_m}{2}, & \text{if } G_{n-1} < \frac{G_N}{2}, G_n = \frac{G_N}{2} = G_{m-1}, G_m > \frac{G_N}{2} \\ & \text{with } n < m \end{cases} \quad (7a)$$

In order to perform a similarity measurement within the weighted environment along a horizontal data slice at an arbitrary time or depth $z_k$, the weighted median similarity is formulated as follows with the previously defined weighted median:

$$M_{\bar{k}}(x_I, y_J, z_K) = \frac{\left\{\sum_{i,j} g_{IJK}(x_i, y_j, z_{\bar{k}})\right\}\{m_{IJK}(z_{\bar{k}})\}^2}{\sum_{i,j} g_{IJK}(x_i, y_j, z_{\bar{k}})\{s(x_i, y_j, z_{\bar{k}})\}^2} \quad (7b)$$

From this, the weighted median coherency follows as a similarity measure by summing over the whole time or depth range of the weighted environment:

$$M(x_I, y_J, z_K) = \frac{\sum_k\left[\left\{\sum_{i,j} g_{IJK}(x_i, y_j, z_k)\right\}\{m_{IJK}(z_k)\}^2\right]}{\sum_k\left[\sum_{i,j} g_{IJK}(x_i, y_j, z_k)\{s(x_i, y_j z_k)\}^2\right]} \quad (7c)$$

Like the weighted coherency in the formulations (6b) and (6c), the weighted median coherency in equation (7c) represents an orientation sensitive similarity measurement, which measures the similarity within the weighted environment in horizontal direction. In analogy to the remarks concerning the weighted coherency, the weighted median coherency may as well be formulated as an orientation insensitive similarity measure if in equation (7b), each of the summations over the horizontal indices i,j is extended by the summation over the vertical index $\bar{k}$, and thus covers all positions within the weighted environment. Moreover, the weighted median $m_{IJK}$ in equation (7b) must not be calculated for a horizontal data slice at an arbitrary time or depth $z_{\bar{k}}$, but for the entire weighted environment. This is accomplished in analogy to equation (7a) by sorting all amplitude values and corresponding weight factors that are contained in the weighted environment.

Horizontal Orientation, and Dip of the Weighted Environment

The layer planes and tectonic boundary planes of the subsurface are often not oriented horizontally, but possess dips of varying strengths and directions. Accordingly, the reflections in a three-dimensional seismic data volume possess different dips as well. Separate similarity values, being calculated in the seismic data volume for local dips, are comparable, if the similarity measurement was carried out with constant orientation with respect to the dip in all cases. Hence, for dip dependent similarity measurements in a weighted environment, the weighted environment is 1. rotated according to the dip direction in the horizontal plane, i.e., is rotated for the respective similarity measurement, and
2. inclined in space according to the dip.

For the similarity measurement in case of horizontal layering, or horizontal orientation of the reflections, respectively, the weighted environment is described in general by equation (1), and in special embodiments by the equations (2)–(5). This weighted environment is referred to in the following as the basic environment, in which no secondary rotations, or dips have been introduced. The basic environment may generally exhibit a horizontal direction of preference. This direction of preference must retain a constant angle to the respective dip direction in similarity measurements with different dip directions. Such an orientation of the basic environment in the horizontal plane is not required only in cases, where no unique direction of preference is present, i.e., in cases of predominant of full horizontal symmetry.

The equations (1)–(5) define the basic environment with an initial horizontal orientation. In case of dip dependent similarity measurements, the orientation of a weighted environment is tied to the direction of dip. This is fixed by assigning a certain horizontal dip direction, or dip azimuth $\phi_o$, respectively, to the initial horizontal orientation of the basic environment.

This dip direction is commonly selected in parallel, or perpendicular to the horizontal direction of preference; however, it can as well have an arbitrary angle to it. For any other dip direction $\Phi_g=\phi_o+\phi$, the weighted environment is rotated by the angle $\phi$, and sheared from the horizontal orientation according to the dip angle $\theta$. Thus, a modified form of the weighted environment from equation (1) is obtained as $$g_{IJK,\phi,\theta}(x_i,y_j,z_k)=g_{\phi,\theta}(x_i-x_I,y_j-y_J,z_k-z_K). \quad (8a)$$

In absence of a direction of preference, a shearing according to the dip angle $\theta$ in the dip direction $\Phi_g=\phi_o+\phi$ is sufficient:

$$g''_{IJK,\phi,\theta}(x_i,y_j,z_k)=g''_{\phi,\theta}(x_i-x_I,y_j-y_J,z_k-z_K). \quad (8b)$$

In case of a dip in the direction of the basic dip azimuth $\phi_o$, only a shearing of the weight function according to the dip angle $\theta$ results. The weight function $g_{\phi,\theta}$ of equation (8a) thus receives the form $$g_{0,\theta}(x,y,z)=g_\theta(x,y,z)=g(x,y,z+[x\sin\phi_o+y\cos\phi_o]\tan\theta). \quad (9a)$$

In case of an azimuth $\Phi_g=\phi_o+\phi$ with $\phi>0°$, the weight function with a direction of preference is additionally rotated in the horizontal plane:

$$g_{\phi,\theta}(x,y,z)=g_\theta(x\cos\phi-y\sin\phi, x\sin\phi+y\cos\phi, z). \quad (9b)$$

In absence of a direction of preference, a rotation of the weight function as in equation (9b) is not required. A shearing in the dip direction $\Phi_g$ is sufficient:

$$g''_{\phi,\theta}(x_i,y_j,z_k)=g(x,y,z+[x\sin\Phi_g+y\cos\Phi_g]\tan\theta). \quad (9c)$$

The weight function g in the equations (9a,c) is defined according to the equations (1)–(5).

Similarity Measure in Case of Horizontal Orientation and Dip of the Weighted Environment In an environment with directional orientation in the horizontal plane, and with dip, the similarity measurements as well take place in dipping planes, that possess a dip angle $\theta$ and a dip azimuth $\phi$. These measurements are performed in analogy to the basic environment without dip:

In the basic environment without dip $g_{IJK}(x_i,y_j,z_k)$ for an analysis position $(x_I,y_J,z_K)$, individual parameters of the similarity measurement are determined in single horizontal planes at the vertical co-ordinate $z_{\bar{k}}$. For special similarity measurements, this is demonstrated in the equations (6a), (7a), (7b) at the parameters $S_{\bar{k}}$, $m_{IJK}(z_{\bar{k}})$, $M_{\bar{k}}$, where exclusively the seismic amplitudes $s(x_i,y_j,z_{\bar{k}})$ and corresponding weight factors $g_{IJK}(x_i,y_j,z_{\bar{k}})$ are used.

In a weighted environment with dip $\theta$ and dip azimuth $\Phi_g=0°$, the individual dipping planes are characterized by their location in depth, or time, respectively:

$$z_{\bar{k},\phi,\theta}(x_i,y_j)=z_{\bar{k}}-\tan\theta(y_j-y_J)$$

For a dip azimuth $\Phi_g\neq 0°$, the planes possess the depth location $$z_{k,\phi,\theta}(x_i,y_j)=z_{\bar{k}}-\tan\theta[(x_i-x_I)\sin\phi+(y_j-y_J)\cos\phi]$$

Here, $z_k$ characterizes the intersection $(x_I,y_J,z_k)$ of the individual plane with a vertical axis through the analysis position $(x_I,y_J,z_K)$. The depth location $z_{k,\phi,\theta}$ of the dipping plane usually does not coincide with the points of the vertical discretization of the seismic volume. Hence, from the data samples $s(x_i,y_j,z_k)$ at the horizontal discretization point $(x_i,y_j)$, a seismic amplitude $\tilde{s}(x_i,y_j,z_{k,\phi,\theta})$ has to be interpolated at the depth location $z_{k,\phi,\theta}(x_i,y_j)$.

The similarity measurements in horizontal planes can be transferred to dipping planes by two changes:

The discretized values $s(x_i,y_j,z_k)$ of the seismic amplitude are replaced by values $\tilde{s}(x_i,y_j,z_{k,\phi,\theta})$, that are interpolated, if required.

A weight function $g_{IJK}(x_i,y_j,z_k)$ with a direction of preference is replaced by $g_{IJK,\phi,\theta}(x_i,y_j,z_k)$ according to the equations (8a), (9b). A weight function $g_{IJK}(x_i,y_j,z_k)$ without a direction of preference, however, is replaced by $g''_{IJK,\phi,\theta}(x_i,y_j,z_k)$ according to the equations (8b), (9c).

These changes are illustrated for the example of a special similarity measure. In case of dip and rotation, the similarity measure that is formulated in equation (6b) for the basic weighted environment, adopts the form $$S_{\phi,\vartheta}(x_I, y_J, z_K) = \sum_k \left[ \left\{ \sum_{i,j} g_{IJK,\phi,\vartheta}(x_i, y_j, z_k) \right\}^{-1} \left\{ \sum_{i,j} g_{IJK,\phi,\vartheta}(x_i, y_j, z_k)\tilde{S}(x_i, y_j, z_{k,\phi,\vartheta}) \right\}^2 \right] \Big/ \sum_k \left[ \sum_{i,j} g_{IJK,\phi,\vartheta}(x_i, y_j, z_k)\{\tilde{S}(x_i, y_j, z_{k,\phi,\vartheta})\}^2 \right] \quad (10)$$

Determination of Local Dip

In the above, methods for the similarity measurements have been presented, which allow to consider local dip in the seismic data volume. Yet, the local dip is unknown. It is assumed, however, that at an analysis point, similarity measurements with different dips usually render a maximum similarity value in that case, where the dip of the measurement coincides with the local dip in the data volume. In order to find this dip dependent maximum with sufficient accuracy, the range of possible dips must be discretized sufficiently densely. This corresponds to a discretization of the solid angle.

A discretization of the solid angle is possible with a multitude of point grids. A polar representation of such grids in the plane represents the dip angle by the length of a radius vector, whereas the azimuth angle controls the direction of the radius vector. In this representation, a radial grid follows from the discretization of dip and azimuth angle in constant intervals. This uniform discretatization of the plane angles is advantageous for a statistical evaluation and for the colour display of strike directions. However, it implies a strongly non-uniform discretization of the solid angle. The quadratic and triangular grid, on the contrary, render a very uniform discretization of the solid angle. In order to observe a minimum accuracy of the discretization, they require significantly less grid points than the radial grid. As a consequence, the radial grid requires a larger computation effort.

According to the invention, a modified radial grid is proposed for the discretization of the solid angle. The modified radial grid reduces the disadvantage of the non-uniform discretization of the solid angle in the radial grid, and the resulting computation effort, but generally preserves the discretization of the dip and azimuth angles with constant steps, which is advantageous for further evaluations.

The discretization of the solid angle, and the calculation of similarity values is carried out in one or two stages:

The first stage starts from a regular radial grid for the discretization of the solid angle. The maximum dip angle of the discretization is termed $\theta_{max}$. At a certain discrete dip angle $\theta_i$ with $\theta_{max}/2 < \theta_i \leq \theta_{max}$, a similarity value is calculated for every discretized azimuth. At dip angles $\theta_i$ with $\theta_{max}/4 < \theta_i \leq \theta max/2$, the calculation is performed for every second azimuth, at dip angles $\theta_i$ with $\theta_{max}/8 < \theta_i \leq \theta_{max}/4$ for every forth azimuth, at dip angles $\theta_i$ with $\theta_{max}/16 < \theta_i \leq \theta_{max}/8$ for every eighth azimuth, etc. The user of the method can define the factor, up to which the azimuth interval is coarsened. In our applications, a factor 4 has proved to be effective. From the calculated similarity values, the maximum is determined, and the corresponding dip and azimuth angles are used as the first dip estimate. In an optional second stage, the accuracy of the first estimate of the azimuth angle can be refined, if this azimuth estimation was performed with a coarsened interval. The coarsened azimuth intervals on both sides of the first estimate are then subdivided by the original azimuth step, and corresponding similarity values are calculated as long as an increase of the similarity values is observed. If the maximum of the similarity values from this second stage exceeds the maximum from the first stage, then the first dip estimate is replaced by the dip and azimuth angles of this general maximum.

For the horizontal orientation of the weighted environment at the dip $\theta_o = 0°$, the present invention implies a multiple discretization of the orientation according to several azimuth angles, if the weighted environment exhibits a direction of preference. The reason for this is the special definition of the azimuth angle, which determines both the rotation of the environment in the horizontal plane, and the dip direction, in case of an environment with a direction of preference. In absence of a direction of preference, a single discretization of the horizontal orientation $\theta_o 0°$ is sufficient.

FIG. 1 shows a modified radial grid in polar representation. In the first stage of the dip dependent calculation of similarity values, the modified grid uses 67 dips, which are marked as black grid points. Grid points, that are omitted in comparison to the original radial grid, are displayed in white.

In the second stage, the dip estimate of the first stage is optionally refined to the accuracy of the original radial grid, as shown in FIG. 1. The assumed dip with maximum similarity of the first stage is marked by a large black point. The dip angle of the maximum corresponds to a circle in this scheme. On this circle, the grid points of the original radial scheme that have not been considered, are marked by six large white points in the azimuth intervals on both sides of the maximum. Similarity values are calculated for these six dips, as long as an increase of the similarity values is observed. Thus, the number of considered dips, or grid points, respectively, can increase to 73 in the modified radial scheme of FIG. 1.

Results

After the detection of t he dip dependent coherency maximum, this coherency maximum and the corresponding dip and azimuth angles are stored as results of the similarity measurements. They are then available for a further digital evaluation, e.g. by pattern recognition. Furthermore, they are graphically displayed to the interpreter on the monitor screen, along cuts through the three-dimensional volume, or along the processed time slices, or horizons, respectively. Such displays are also printed on the printers that belong to the data processing system.

Applications Example

For a three-dimensional volume of seismic poststack data, a similarity volume was computed with help of the previously described invention. A weighted environment was defined by the Gaussian bell shaped exponential curve $e^{-d^2}$, where d is a scaled distance according to equation (5b). A distance scaling according to $a^{-1} = 7.5$ $\Delta u$ was used, with $\Delta u$ being the average interval of the horizontal discretization in the seismic volume. Beyond a radius of 11.5 grid points around each analysis point, the weighting was set to the value 0.

The local similarity measurement in such an environment was performed with the weighted semblance according to equations (6b) and (10). The similarity measurements were executed in dipping environments. On principle, the dips were selected according to the scheme of FIG. 1. The spatial orientation is given by annotations N, denoting north, and E, denoting east. For each analysis position, the maximum similarity value that was thus determined, and the corresponding azimuth and dip angles were stored. These three parameters are displayed in FIG. 2a–c for a horizontal plane, i.e., for a time slice of the seismic volume.

Figure 2A:
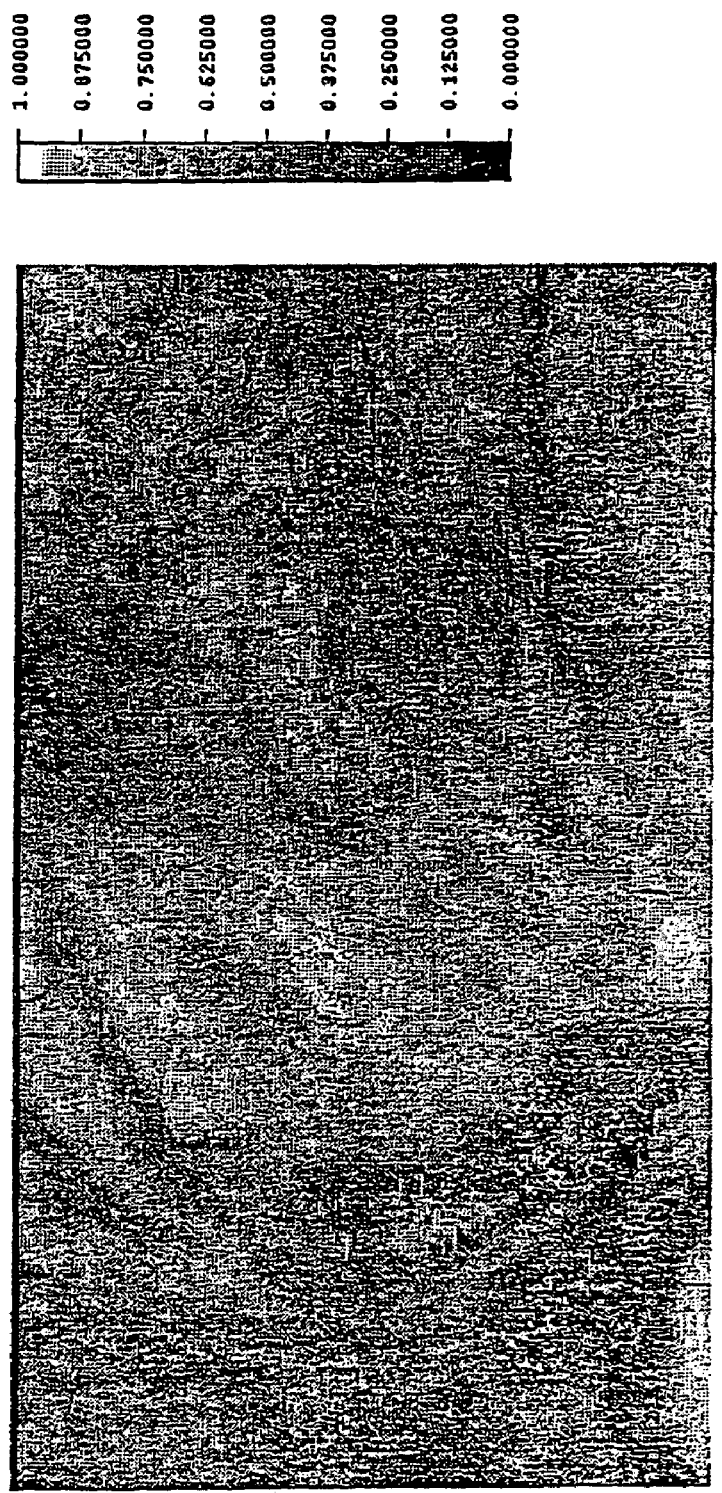
FIG. 2 for a time slice of a seismic in a) the obtained maximum local similarity value, in b) the corresponding dip angle and in c) the corresponding dip azimuth.
Figure 2B:
Figure 2C:
Figure 3:
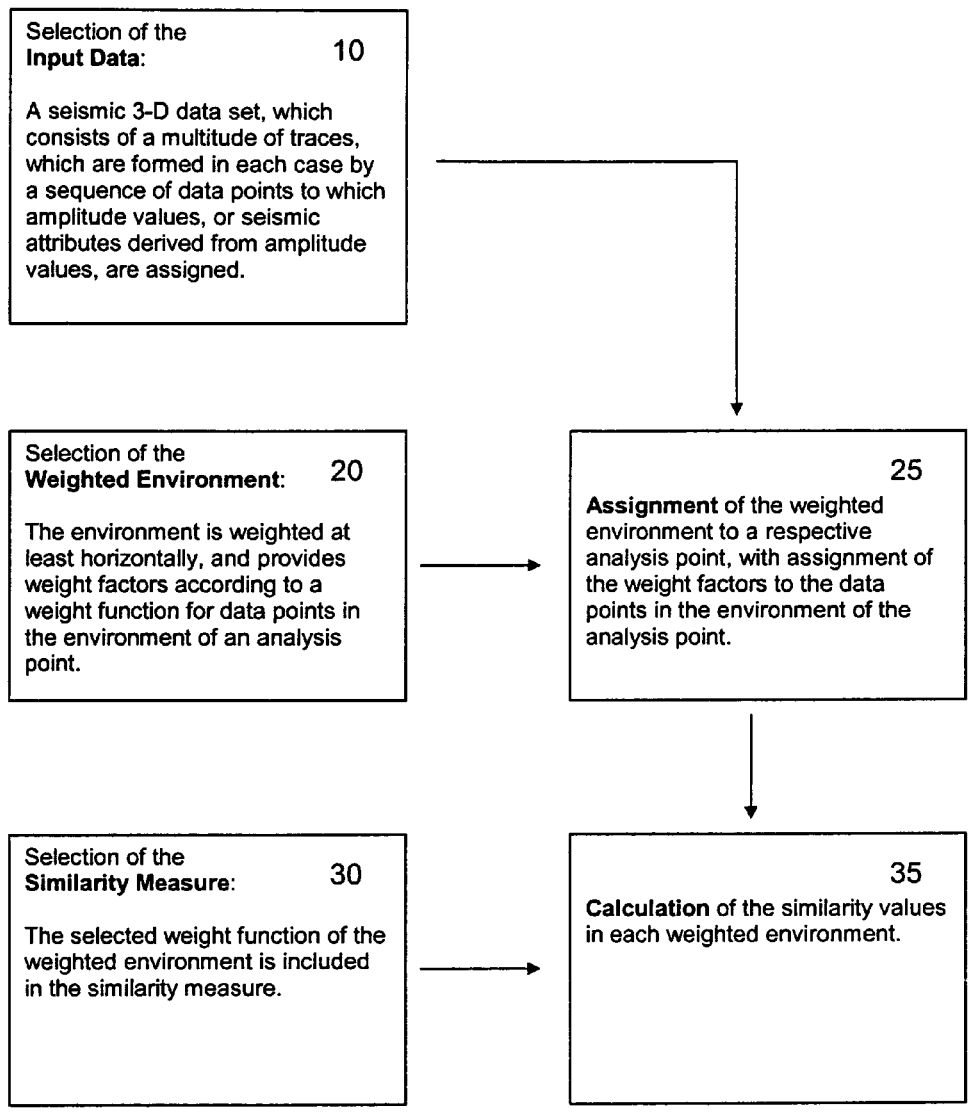
FIG. 3 is a flow diagram illustrating a first embodiment of the invention, and FIG. 4. is a flow diagram illustrating a second embodiment of the invention.
Figure 4:
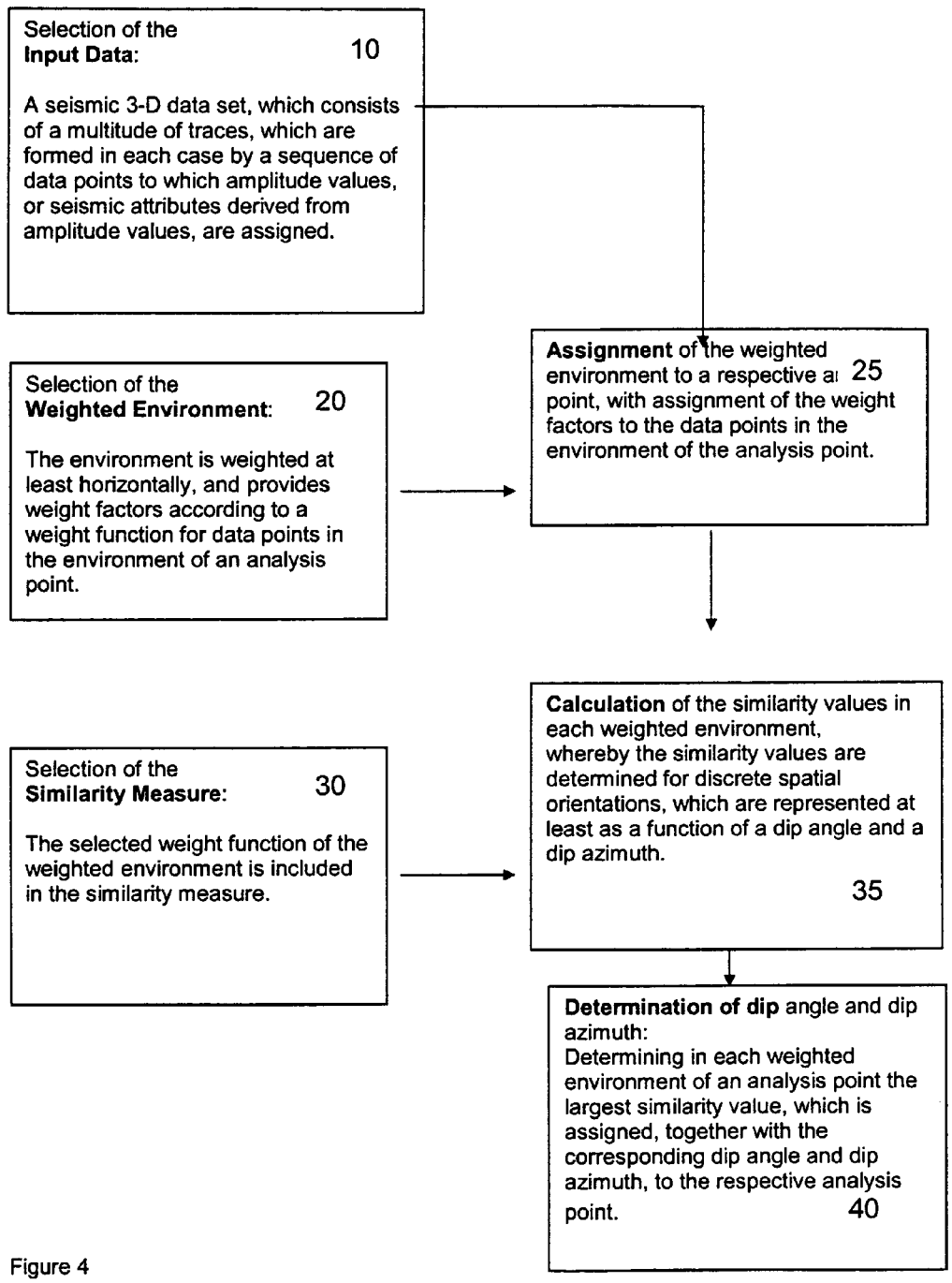

The value ranges are supplied with the corresponding gray scale. In FIG. 2a, the coherency is displayed in the value range from 0.0 (black) to 1.0 (white) for a time slice from a seismic data volume. FIG. 2b shows the local dip angle at maximum coherency for the coherency display of FIG. 2a. The value range extends from −50° (black) to 0° (white) and +50° (black). FIG. 2c shows the derived local dip azimuth for the coherency of FIG. 2a, and for the dip angle of FIG. 2b, respectively. The displayed value range extends from 0° (black) over 90° (white) to 180° (black).

What is claimed is:

1. A method for the determination of local similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:
assigning an environment that is weighted at least horizontally, to a respective analysis point, wherein weight factors according to a weight function are assigned to the data points in the environment of the analysis point;
calculating similarity values in each weighted environment, whereby the weight function is included in the similarity measure.

2. A method for the determination of local dip dependent similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:
assigning a weighted environment to a respective analysis point, wherein weight factors according to a weight function are assigned to the data points in the environment of the analysis point;
calculating similarity values in each weighted environment, whereby the weight function is included in the similarity measure, and similarity values are determined for discrete spatial orientations, and the similarity values are represented at least as a function of a dip angle and a dip azimuth; and
determining, in each weighted environment of an analysis point, the largest similarity value, which is assigned, together with the corresponding dip angle and dip azimuth, to the respective analysis point.

3. The method according to claim 1, wherein the weight function is centered at the analysis point, and exhibits decreasing values away from the analysis point.

4. The method according to claim 1, wherein the weighting is embodied by window functions, especially as triangular, Hamming-, Hanning- or Daniell function.

5. The method according to claim 1, wherein functions which continuously decay with distance (d) up to infinify from the analysis point, especially $d^{-c}$, $e^{-cd}$, $e^{-cdd}$ with c=arbitrary constant, are used for the weighting, whereby the functions have the value zero beyond a maximum distance ($d_{max}$) from the analysis point.

6. The method according to claim 1, wherein the weighting is formed as the product of two functions, whereby one of the functions does not, or not completely, decay with the distance from the analysis point, and the other function is a window function, which possesses the value 1 in the central area of the environment, comprises a decrease from 1 to 0 in the edge area, and adopts the value 0 outside the environment.

7. A method for the determination of local similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:
assigning an environment that is weighted at least horizontally, to a respective analysis point, wherein weight factors according to a weight function are assigned to the data points in the environment of the analysis point;
calculating similarity values in each weighted environment, whereby the weight function is included in the similarity measure,
wherein the weighted environment is formed with rotational symmetry to the analysis point at least in the horizontal plane.

8. The method according to claim 2, wherein the weight function is centered at the analysis point, and exhibits decreasing values away from the analysis point, wherein the weighted environment, which is not formed with rotational symmetry to the analysis point in the horizontal plane, and which exhibits a direction of preference, is rotated with the respective dip azimuth, for the determination of similarity values.

9. A method for the determination of local similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:
assigning an environment that is weighted at least horizontally, to a respective analysis point, wherein weight factors according to a weight function are assigned to the data points in the environment of the analysis point;
calculating similarity values in each weighted environment, whereby the weight function is included in the similarity measure, wherein the interval between neighboring analysis points in the 3-D dataset is selected as multiples of the data point intervals.

10. The method according to claim 2, wherein the weight function is centered at the analysis point, and exhibits decreasing values away from the analysis point, wherein the dip and azimuth angles in a radial grid are each discretized in constant angle steps, and that, in the calculation of the similarity values with dependence on the discrete dip angle ($\theta_i$), starting from a pre-defined maximum dip angle ($\theta_{max}$), the resulting discrete dips are considered as follows: at dip angles $\theta_i$ with $\theta_{max}/2 < \theta_i \leq \theta_{max}$, a similarity value is calculated for every discretized azimuth, at dip angles $\theta_i$ with $\theta_{max}/4 < \theta_i \leq \theta_{max}/2$, the calculation is performed for every second azimuth, at dip angles $\theta_i$ with $\theta_{max}/8 < \theta_i \leq \theta_{max}/4$ for every forth azimuth, at dip angles $\theta_i$ with $\theta_{max}/16 < \theta_i \leq \theta_{max}/8$ for every eighth azimuth, etc., with a preferred termination at the fourth subdivision.

11. The method according to claim 10, wherein for a dip estimate in a coarsened azimuth interval, similarity values are calculated at the original angle steps on both sides of the first estimate, as long as an increase of the similarity values is observed, whereby the first dip estimate is replaced by the dip and azimuth angles of the this general similarity maximum, if the maximum of the similarity values from this second stage exceeds the maximum from the first stage.

12. The method according to claim 1, wherein the similarity is computed along arbitrarily oriented planes as the square of the representative attribute (amplitude), divided by the average of the squared attribute (amplitude).

13. The method according to claim 12, wherein the representative attribute is the median of the attributes to be analyzed.

14. The method according to claim 13, wherein horizontal data slice at a time or depth $z_{\bar{k}}$ with a total of N amplitude values $s(x_i,y_j,z_{\bar{k}})$, as well as N corresponding weight factors $g_{IJK}$ $(x_i,y_j,z_{\bar{k}})$ is considered, whereby the amplitude values are sorted in increasing order, and newly indexed, as: $s_1 \leq s_2 \leq s_3 \leq \ldots \leq s_{N-1} \leq s_N$, this sorting and indexing is transferred to the values of the weight function $g_{IJK}$ belonging to the seismic amplitudes, as: $g_1, g_2, g_3, \ldots g_{N-1}, g_n$, and partial sums of the weight factors are derived $G_1 \leq G_2 \leq G_3 \leq \ldots \leq G_{N-1} \leq G_N$, with $G_n = \Sigma g_i (i=1 \text{ to } n)$, wherefrom the weighted median can be calculated as $$m_{IJK}(z_{\bar{k}}) = \begin{cases} s_n, & \text{if } G_{n-1} < \frac{G_N}{2}, G_n > \frac{G_N}{2} \\ \frac{s_n + s_m}{2}, & \text{if } G_{n-1} < \frac{G_N}{2}, G_n = \frac{G_N}{2} = G_{m-1}, G_m > \frac{G_N}{2} \\ & \text{with } n < m \end{cases}$$

and from this, the weighted median similarity follow for a horizontal data slice at an arbitrary time or depth $z_{\bar{k}}$:

$$M_{\bar{k}}(x_I,y_J,z_K) = \frac{\left\{\sum_{i,j} g_{IJK}(x_i,y_j,z_{\bar{k}})\right\}\{m_{IJK}(z_{\bar{k}})\}^2}{\sum_{i,j} g_{IJK}(x_i,y_j,z_{\bar{k}})\{s(x_i,y_j,z_{\bar{k}})\}^2},$$

wherefrom, by summation over the entire time or depth range of the weighted environment, the weighted median coherency follows as a similarity measure, as:

$$M(x_I,y_J,z_K) = \frac{\sum_k \left[\left\{\sum_{i,j} g_{IJK}(x_i,y_j,z_k)\right\}\{m_{IJK}(z_k)\}^2\right]}{\sum_k \left[\sum_{i,j} g_{IJK}(x_i,y_j,z_k)\{s(x_i,y_j,z_k)\}^2\right]}.$$

15. The method according to claim 1, wherein the similarity is calculated as semblance modified to consider the weighted environment $g_{IJK}(x_i,y_j,z_k)$, for an analysis position $(x_I,y_J,z_K)$ as $$S_{\bar{k}}(x_I,y_J,z_K) = \frac{\left\{\sum_{i,j} g_{IJK}(x_i,y_j,z_{\bar{k}})\right\}^{-1}\left\{\sum_{i,j} g_{IJK}(x_i,y_j,z_{\bar{k}})s(x_i,y_j,z_{\bar{k}})\right\}^2}{\sum_{i,j} g_{IJK}(x_i,y_j,z_{\bar{k}})\{s(x_i,y_jz_{\bar{k}})\}^2},$$

wherefrom, by summation over the entire time or depth range of the weighted environment, the similarity measure of the weighted coherency follows:

$$S(x_I,y_J,z_K) = \frac{\sum_k \left[\left\{\sum_{i,j} g_{IJK}(x_i,y_j,z_k)\right\}^{-1}\left\{\sum_{i,j} g_{IJK}(x_i,y_j,z_k)s(x_i,y_j,z_k)\right\}^2\right]}{\sum_k \left[\sum_{i,j} g_{IJK}(x_i,y_j,z_k)\{s(x_i,y_j,z_k)\}^2\right]}.$$

16. The method according to claim 2, wherein the weight function is centered at the analysis point, and exhibits decreasing values away from the analysis point.

17. The method according to claim 2, wherein the weighting is embodied by window functions, especially as triangular, Hamming-, Hanning- or Daniell function.

18. The method according to claim 2, wherein functions which continuously decay with distance (d) up to infinify from the analysis point, especially $d^{-c}$, $e^{-cd}$, $e^{-cdd}$ with c=arbitrary constant, are used for the weighting, whereby the functions have the value zero beyond a maximum distance ($d_{max}$) from the analysis point.

19. The method according to claim 2, wherein the weighting is formed as the product of two functions, whereby one of the functions does not, or not completely, decay with the distance from the analysis point, and the other function is a window function, which possesses the value 1 in the central area of the environment, comprises a decrease from 1 to 0 in the edge area, and adopts the value 0 outside the environment.

20. A method for the determination of local dip dependent similarity values for geological units in the subsurface from a seismic 3-D dataset, which consists of a multitude of traces, which are formed in each case by a sequence of data points, to which amplitude values, or seismic attributes derived from the amplitude values, are assigned, with the steps:

assigning a weighted environment to a respective analysis point, wherein weight factors according to a weight function are assigned to the data points in the environment of the analysis point;

calculating similarity values in each weighted environment, whereby the weight function is included in the similarity measure, and similarity values are determined for discrete spatial orientations, and the similarity values are represented at least as a function of a dip angle and a dip azimuth; and determining, in each weighted environment of an analysis point, the largest similarity value, which is assigned, together with the corresponding dip angle and dip azimuth, to the respective analysis point, wherein the weighted environment is formed with rotational symmetry to the analysis point at least in the horizontal plane.

* * * * *